(12) United States Patent
Zimmerman (10) Patent No.: US 12,366,238 B2
(45) Date of Patent: Jul. 22, 2025

(54) SOFT SERVE ICE CREAM PUMP ASSEMBLY

(71) Applicant: Plum Creek Farm LLC, Bernville, PA (US)

(72) Inventor: Keith Zimmerman, Leesport, PA (US)

(73) Assignee: Plum Creek Farm LLC, Bernville, PA (US)

( * ) Notice: Subject to any disclaimer, the term of this patent is extended or adjusted under 35 U.S.C. 154(b) by 118 days.

(21) Appl. No.: 18/376,167

(22) Filed: Oct. 3, 2023

(65) Prior Publication Data

US 2024/0315273 A1 Sep. 26, 2024

Related U.S. Application Data

(60) Provisional application No. 63/491,378, filed on Mar. 21, 2023.

(51) Int. Cl.
| | |
|---|---|
| *F04B 43/073* | (2006.01) |
| *F04B 13/02* | (2006.01) |
| *F04B 15/02* | (2006.01) |
| *F04B 53/10* | (2006.01) |

(52) U.S. Cl.
CPC ............ *F04B 43/073* (2013.01); *F04B 13/02* (2013.01); *F04B 15/02* (2013.01); *F04B 53/1047* (2013.01)

(58) Field of Classification Search
CPC ...... F04B 13/02; F04B 15/02; F04B 53/1047; F04B 43/073
See application file for complete search history.

(56) References Cited

U.S. PATENT DOCUMENTS

| | | | | |
|---|---|---|---|---|
| 3,299,826 A | * | 1/1967 | Williams | F04B 43/073 91/335 |
| 3,816,034 A | * | 6/1974 | Rosenquest, Jr. | F04B 43/073 92/13.8 |
| 10,267,303 B2 | * | 4/2019 | Verdugo | F04B 43/073 |

* cited by examiner

*Primary Examiner* — Bryan M Lettman
(74) *Attorney, Agent, or Firm* — Ryder, Mazzeo & Konieczny, LLC; Joseph M. Konieczny, Sr.

(57) ABSTRACT

A pump assembly includes a diaphragm pump having a diaphragm extending across a chamber to define a gas chamber on a first side of the diaphragm and a mixture receiving chamber on a second, opposite side of the diaphragm. A shaft extends through the diaphragm and moves therewith between a default position and an extended position. The mixture receiving chamber is configured to receive liquid mixture via a mixture inlet and pass mixture to a pressure chamber via a mixture outlet. The gas chamber has an inlet port receiving gas of a desired pressure and an outlet port. The shaft seals between the inlet port and the outlet port until the diaphragm and shaft are in the extended position at which time gas in the gas chamber passes from the gas chamber to the pressure chamber. The pressure chamber has a pressure outlet configured to deliver a pressurized liquid mixture and gas to a freezing chamber. Each stroke of the diaphragm causes pressurized liquid mixture and gas to be passed into the pressure chamber and to the pressure outlet.

20 Claims, 12 Drawing Sheets

SOFT SERVE ICE CREAM PUMP ASSEMBLY

This application claims the benefit of U.S. Prov. Appln. No. 63/491,378, filed Mar. 21, 2023, the contents of which are incorporate herein by reference.

FIELD OF THE DISCLOSURE

The present disclosure relates to soft serve ice cream machines. More particularly, the disclosure relates to pump assemblies utilized with soft serve ice cream machines.

BACKGROUND

In the mechanical production of ice cream and other frozen dessert products, an ice cream mix is normally combined with a non-toxic gas such as air in order to produce a tasteful, palatable and profitable end product. For soft serve ice cream, the air content can vary from 0% to 60% of the total volume of the finished product. The amount of air alters the taste of the finished product. Product with low quantities of air has a heavy, icy taste while product with higher air content tastes creamier, smoother and lighter. The optimum quantity of air is determined by the other ingredients and individual taste. In general, the preferred air content is between 30% and 45% of volume.

The soft serve ice cream liquid mix is kept preserved at the ideal temperature in a tank (stainless steel or other material) that is refrigerated and controlled by a thermostat. The ice cream mix remains there until it is delivered by means of gravity or a pump into the freezing chamber where it is intimately mixed with the targeted quantity of air, stirred, and quickly frozen to obtain a soft serve ice cream.

An important reason for a machine to have a pump is to increase the volume of the ice cream by adding air to the ice cream mix. This affects the machine in two ways: First, it reduces the amount of mix in a given volume of ice cream, which increases the output of the machine per hour; and, secondly, it decreases the density of ice cream, and thus increases ice cream "softness" creating a sensation that it is less cold to the palate.

Under ideal working condition, the pump delivers a constant, perfect supply of liquid mix and gas (usually air) to the freezing chamber in a predetermined ratio between air and liquid mix.

SUMMARY

In at least one embodiment, the present disclosure provides a pump assembly including a diaphragm pump having a diaphragm extending across a chamber to define a gas chamber on a first side of the diaphragm and a mixture receiving chamber on a second, opposite side of the diaphragm. A shaft extends through the diaphragm and moves therewith between a default position and an extended position. The mixture receiving chamber is configured to receive liquid mixture via a mixture inlet and pass mixture to a pressure chamber via a mixture outlet. The gas chamber has an inlet port receiving gas of a desired pressure and an outlet port. The shaft seals between the inlet port and the outlet port until the diaphragm and shaft are in the extended position at which time gas in the gas chamber passes from the gas chamber to the pressure chamber. The pressure chamber has a pressure outlet configured to deliver a pressurized liquid mixture and gas to a freezing chamber. Each stroke of the diaphragm causes pressurized liquid mixture and gas to be passed into the pressure chamber and to the pressure outlet.

BRIEF DESCRIPTION OF THE DRAWINGS

The accompanying drawings, which are incorporated herein and constitute part of this specification, illustrate the presently preferred embodiments of the invention, and, together with the general description given above and the detailed description given below, serve to explain the features of the invention. In the drawings.

DETAILED DESCRIPTION

In the drawings, like numerals indicate like elements throughout. Certain terminology is used herein for convenience only and is not to be taken as a limitation on the present invention. The following describes preferred embodiments of the present invention. However, it should be understood, based on this disclosure, that the invention is not limited by the preferred embodiments described herein.

Figure 1:
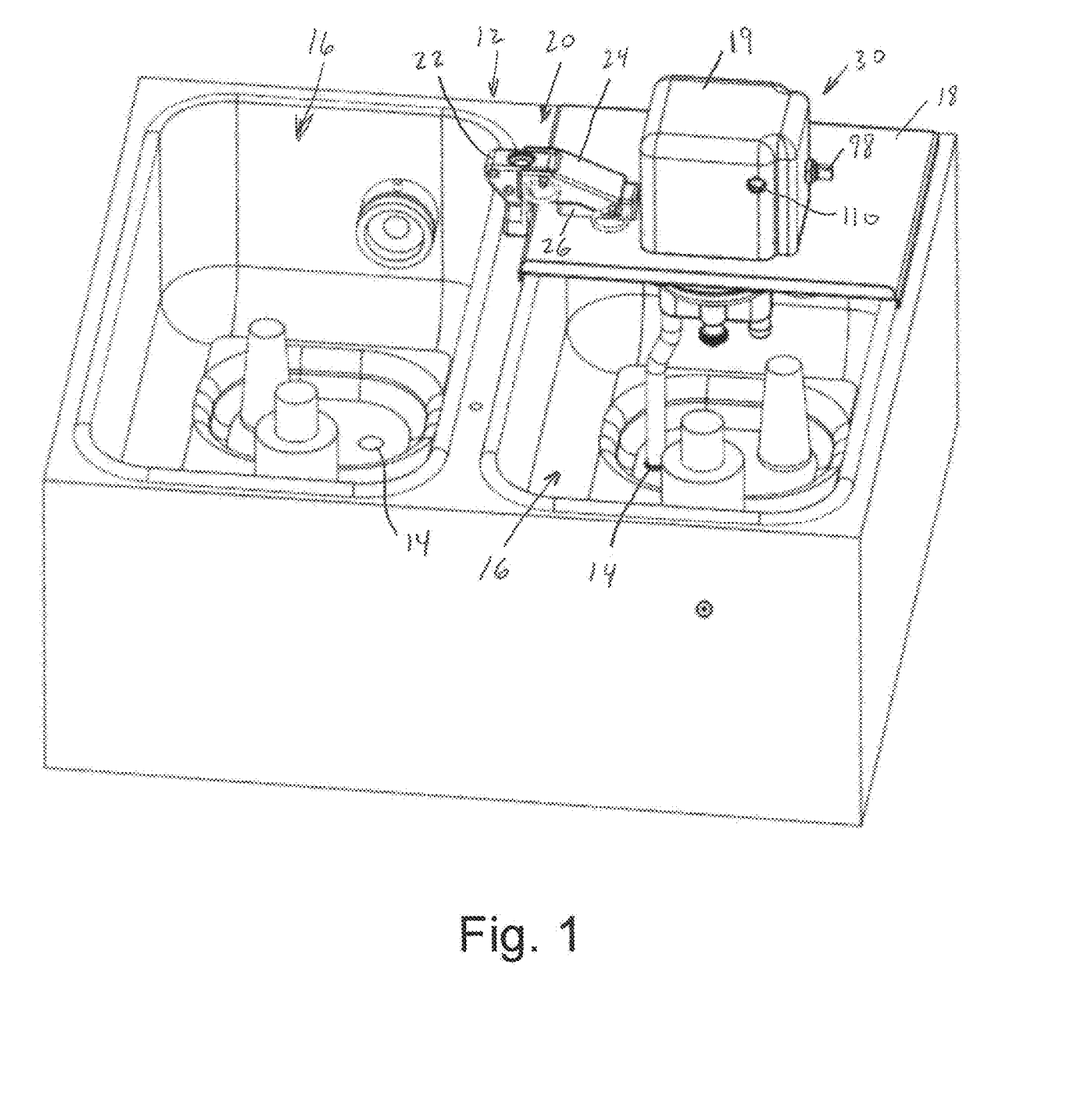
FIG. 1 is an isometric view of a dual hopper assembly with a portion of the hopper cover removed to show an illustrative pump within one of the hoppers.

Referring to FIG. 1, an illustrative double hopper assembly 12 for use with a soft serve ice cream machine is shown. An illustrative ice cream machine (not shown) generally includes a housing which supports a freezing chamber (not shown) relative to a respective hopper 16, along with other components for operating the machine. The liquid mixture (not shown) is added to the respective hopper 16 and then the hopper cover 18 is placed on the hopper 16. The hopper 16 is configured to maintain the liquid mixture at a desired temperature before it is delivered to the freezing chamber via an outlet port 14. A pump assembly 30 is positioned to extend within the hopper 16 and is configured to combine the liquid mixture with a gas (typically air) and to deliver the liquid/gas mixture to the freezing chamber at a desired pressure. While the pump assembly 30 is shown positioned supported by the hopper cover 18 with a portion extending within the hopper 16, it is understood that the pump assembly 30 may be integrated into the hopper independent of the hopper cover 18.

In the present embodiment, a hinge assembly 20 is positioned between the hopper 16 and the cover 18 to facilitate pivoting of the hopper cover 18 and the pump assembly 30 to an open position, for example, for cleaning. The hinge assembly 20 includes a post 22 extending from a rim of the hopper 16. An arm member 24 extends from the post 22 to a block 26 extending from the hopper cover 18. A first pin 21 extends through the arm member 24 and a first pin hole 27 in the post 22 to pivotally support the arm 24 relative to the post 22. A second pin 25 extends through the arm 24 and through a pin hole in the block 26 to pivotally secure the arm 24 to the block 26. A third pin 23 is configured to be positioned to extend through the arm 24 and one of the other pin holes 27 in the post 22 to retain the arm 24, and thereby the hopper cover 18 and pump assembly 30, in a position relative to the hopper 16.

Figure 2:
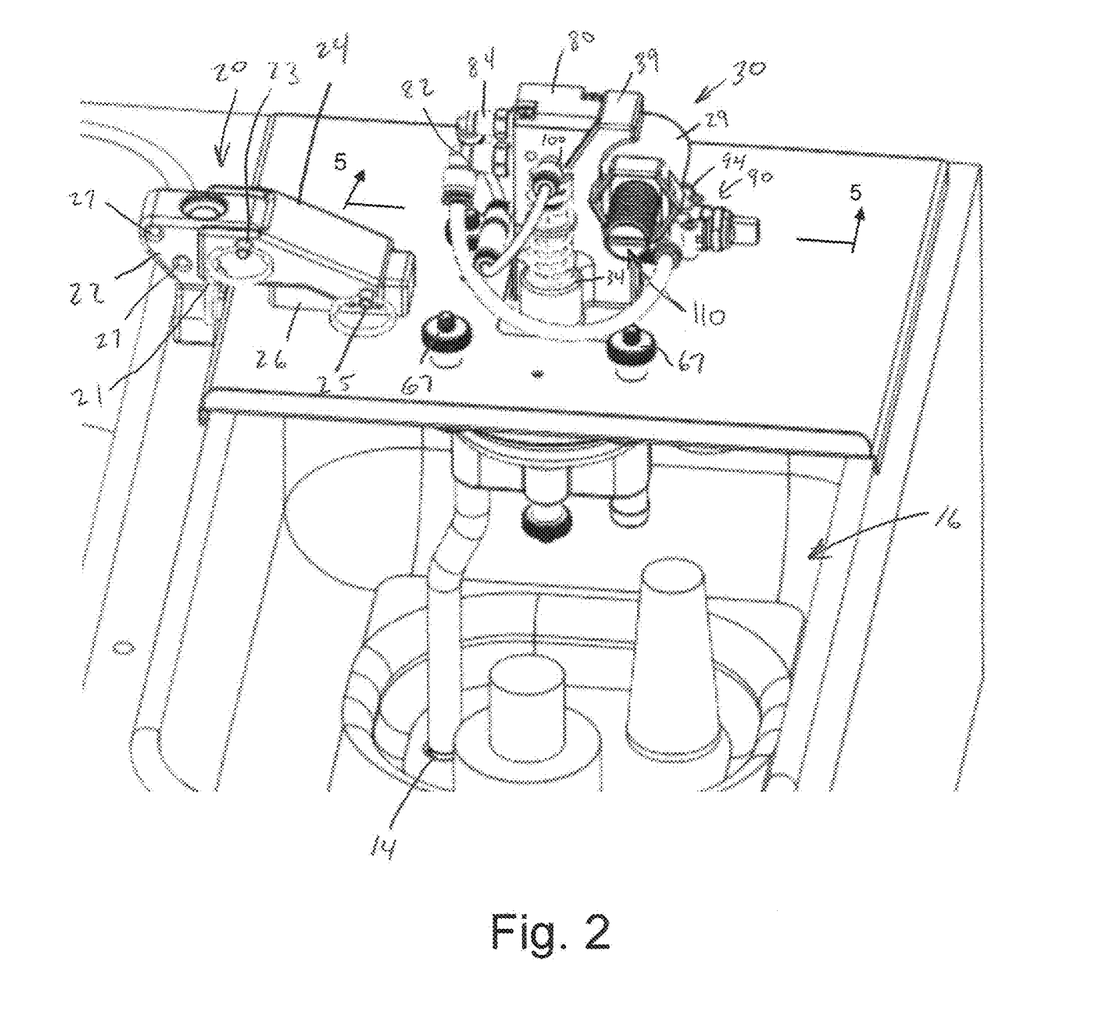
FIG. 2 is an expanded isometric view of the pump of FIG. 1 with the outer housing removed.
Figure 3:
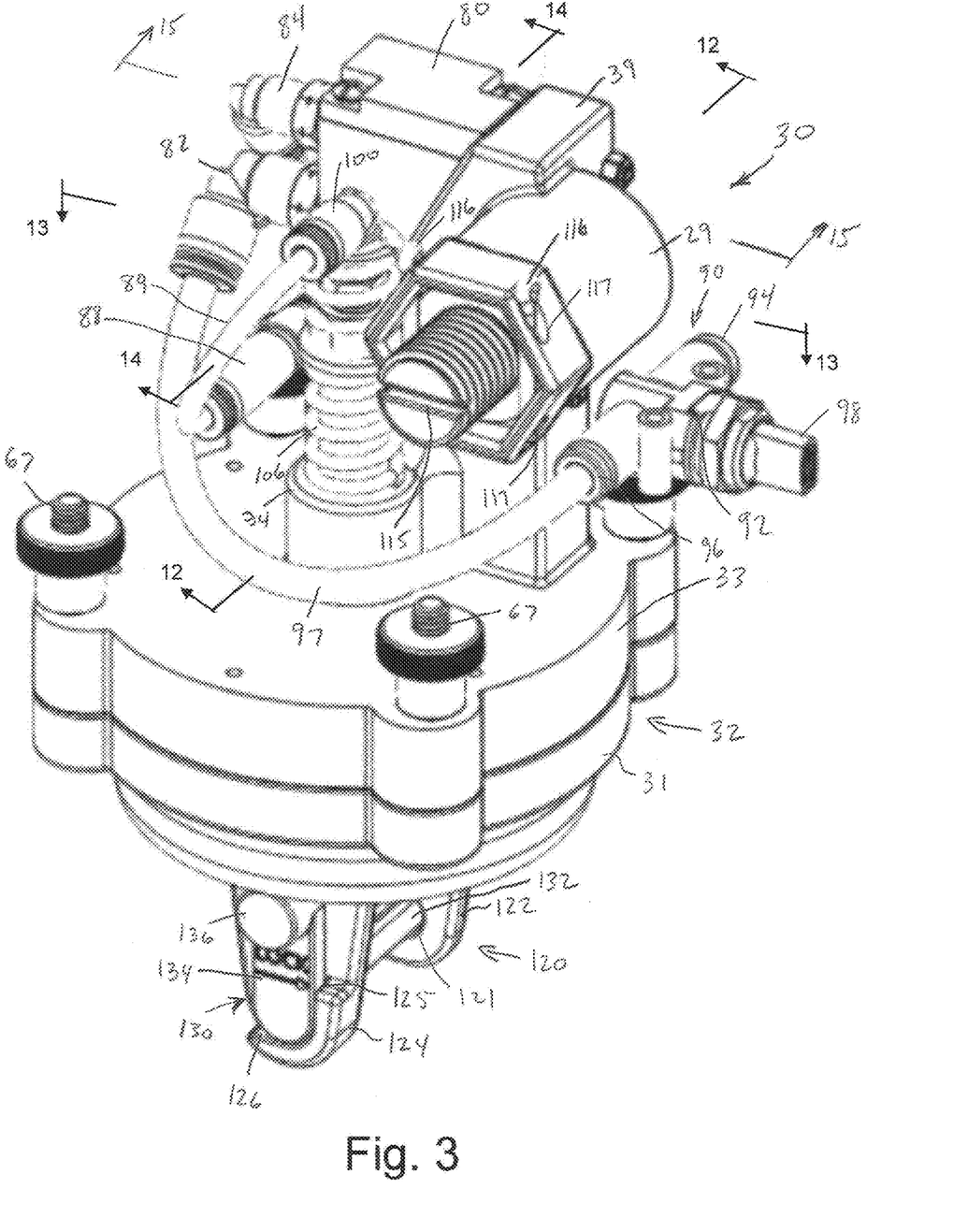
FIG. 3 is a front isometric view of a pump in accordance with an embodiment of the disclosure.
Figure 4:
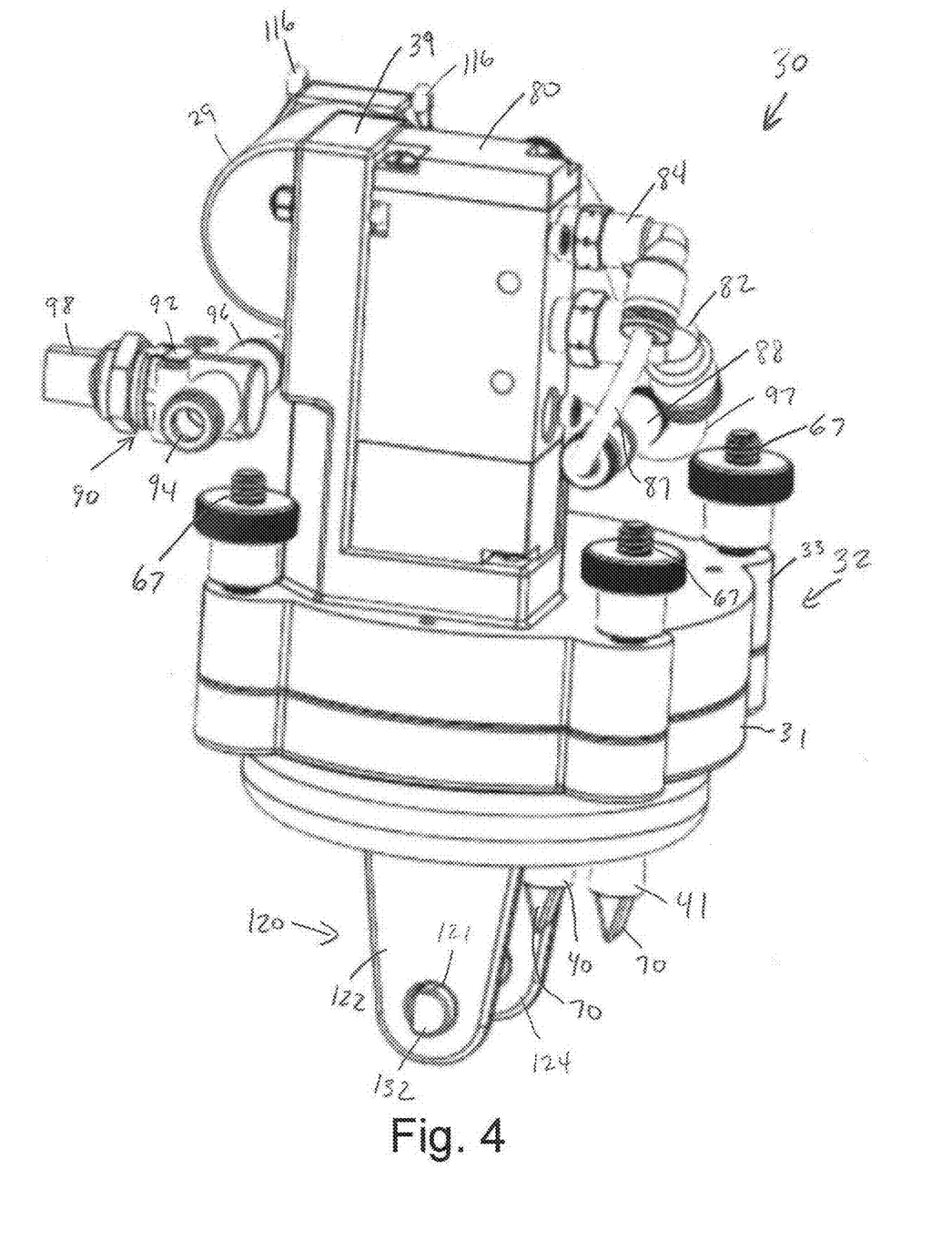
FIG. 4 is a rear isometric view of the pump of FIG. 3.
Figure 5:
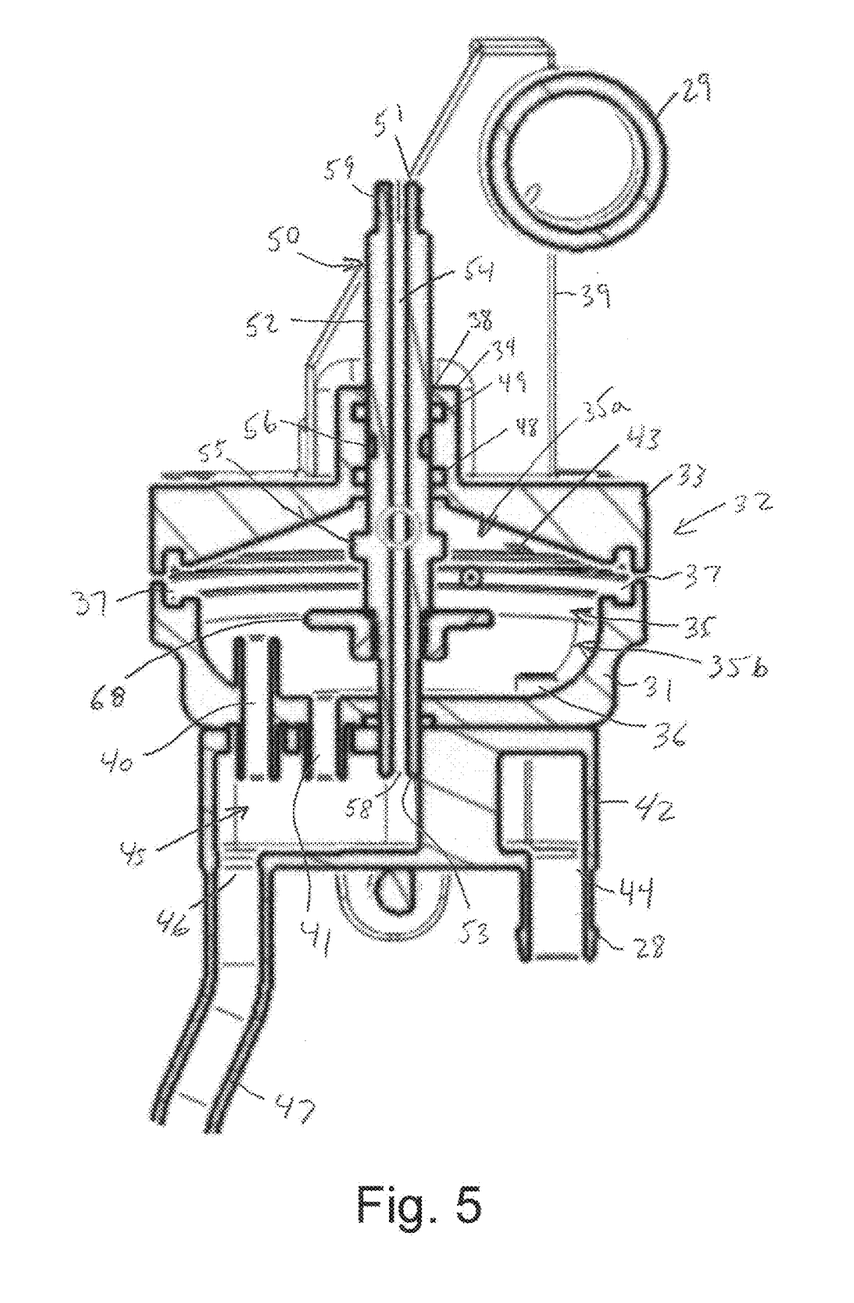
FIG. 5 is a cross-sectional view along the line 5-5 in FIG. 2, with the internal valves and diaphragm removed.
Figure 10:
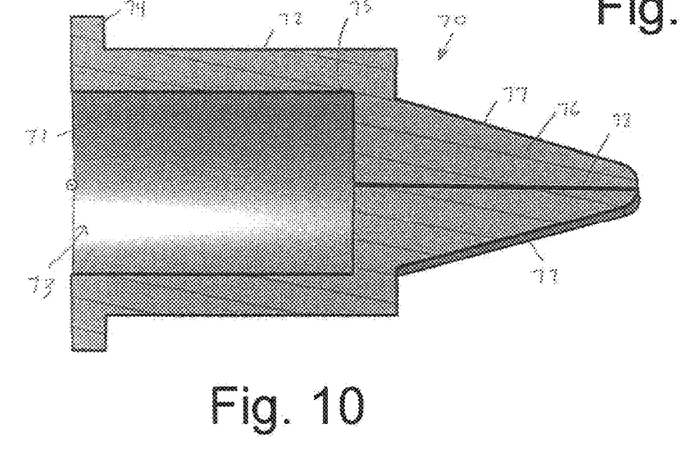
FIG. 10 is a cross-sectional view through the valve member of FIG. 8.
Figure 11:
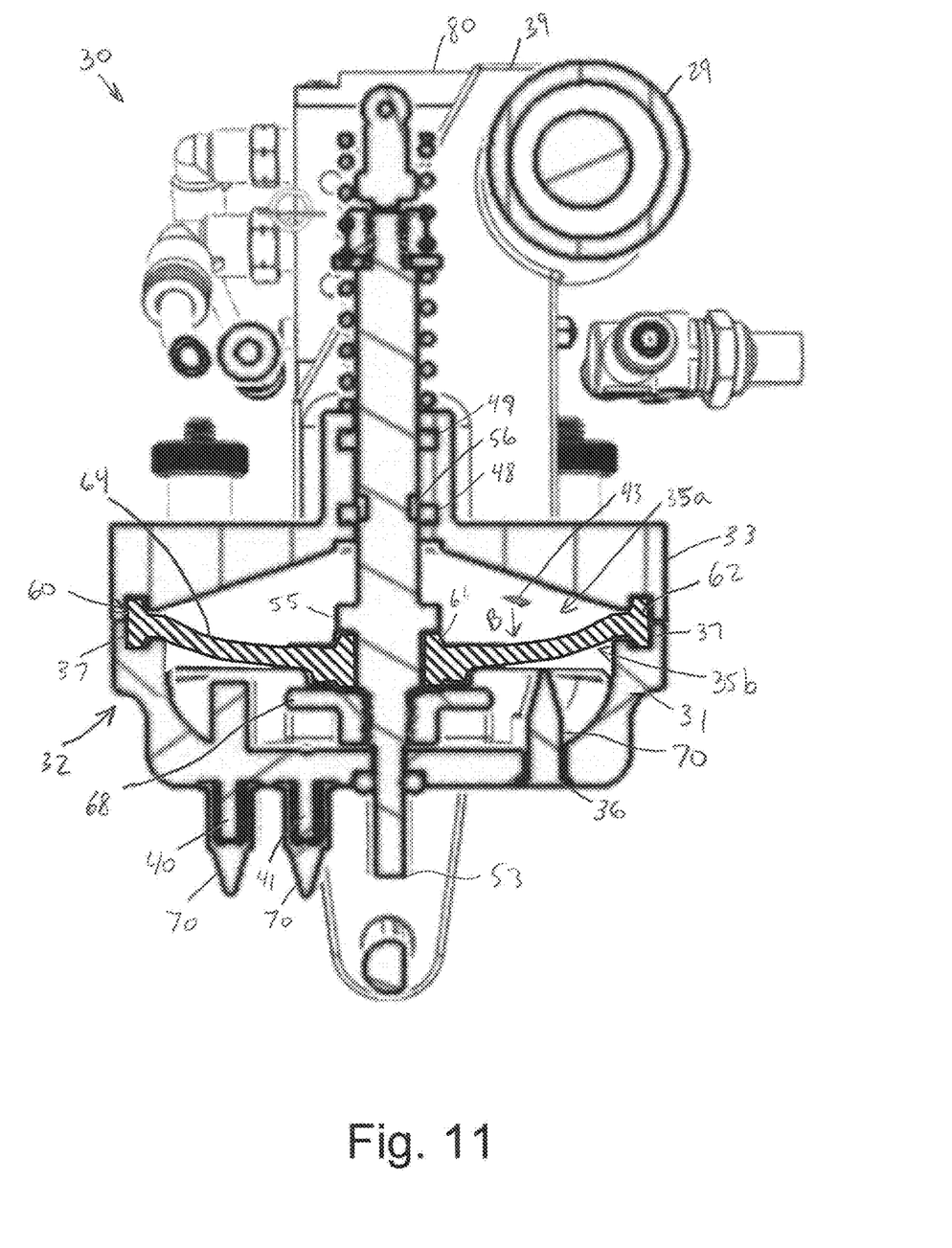
FIG. 11 is cross-sectional view similar to FIG. 5 with the internal valves and diaphragm shown.
Figure 12:
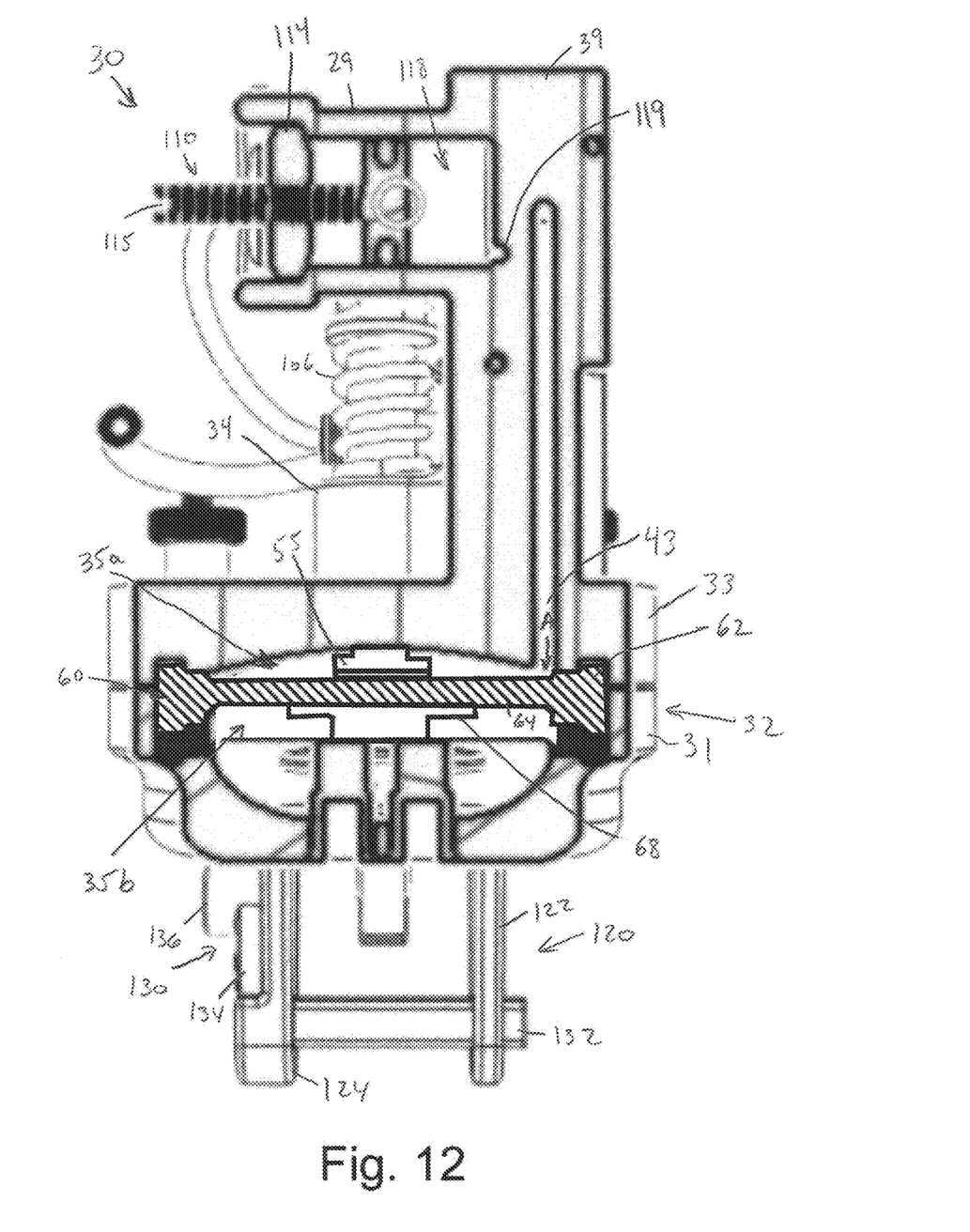
FIG. 12 is a cross-sectional view along the line 12-12 in FIG. 3.

Referring to FIGS. 3-14, a pump assembly 30 in accordance with an embodiment of the disclosure will be described. The pump assembly 30 generally includes a pump housing 32, a central shaft 50, a diaphragm 60, a manifold 80 and an air control valve 90. As shown in FIG. 1, an external cover 19 may be positioned over the external portions of the pump assembly 30. With reference to FIGS. 5 and 12, the pump housing 32 includes opposed halves 31, 33 which define an internal chamber 35. Bolts 67 or the like interconnect the opposed halves 31, 33. The bolts 67 may also be utilized to connect the pump assembly 30 to the hopper cover 18 (see FIG. 2).

Figure 7:
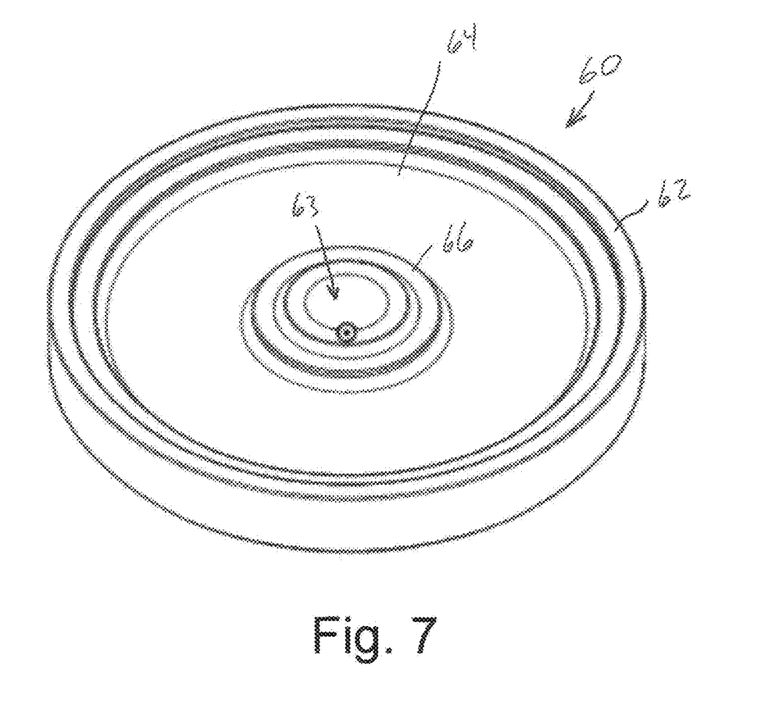
FIG. 7 is an isometric view of the diaphragm of the pump of FIG. 3.

As illustrated in FIG. 12, when the diaphragm 60 extends across the internal chamber 35, it divides the chamber 35 into an air chamber 35a and a receiving chamber 35b, as will be described in more detail hereinafter. With reference to FIG. 7, the diaphragm 60 of the present embodiment is a disc shaped structure with a flexible membrane 64 extending within a thickened outer rim 62. While the illustrated diaphragm 60 has a disc shape, it is not limited to such and may have other shapes. A central passage 63 through the flexible membrane 64 is configured for passage of the central shaft 50, as will be described. The illustrated embodiment includes a thickened central area 66 about the central passage 63 to provide strength at the junction with the central shaft 50. Referring again to FIGS. 5 and 12, the opposed haves 31, 33 of the pump housing 32 define a perimeter slot 37 configured to receive and retain the outer rim 62 of the diaphragm 60.

Figure 6:
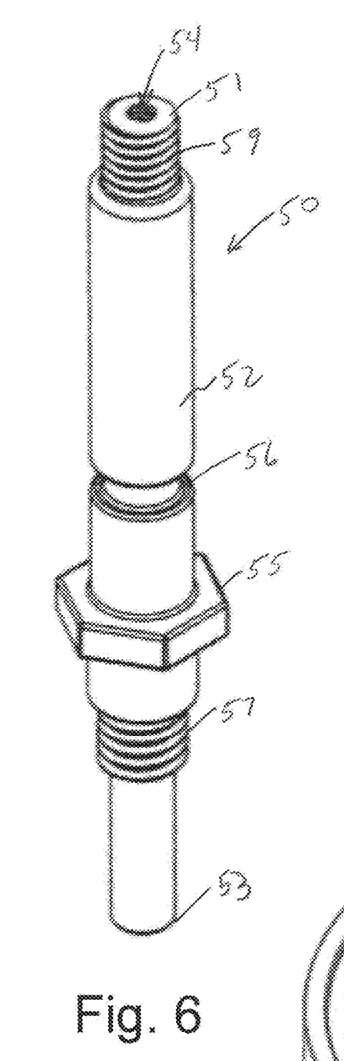
FIG. 6 is an isometric view of the central shaft of the pump of FIG. 3.
Figure 14:
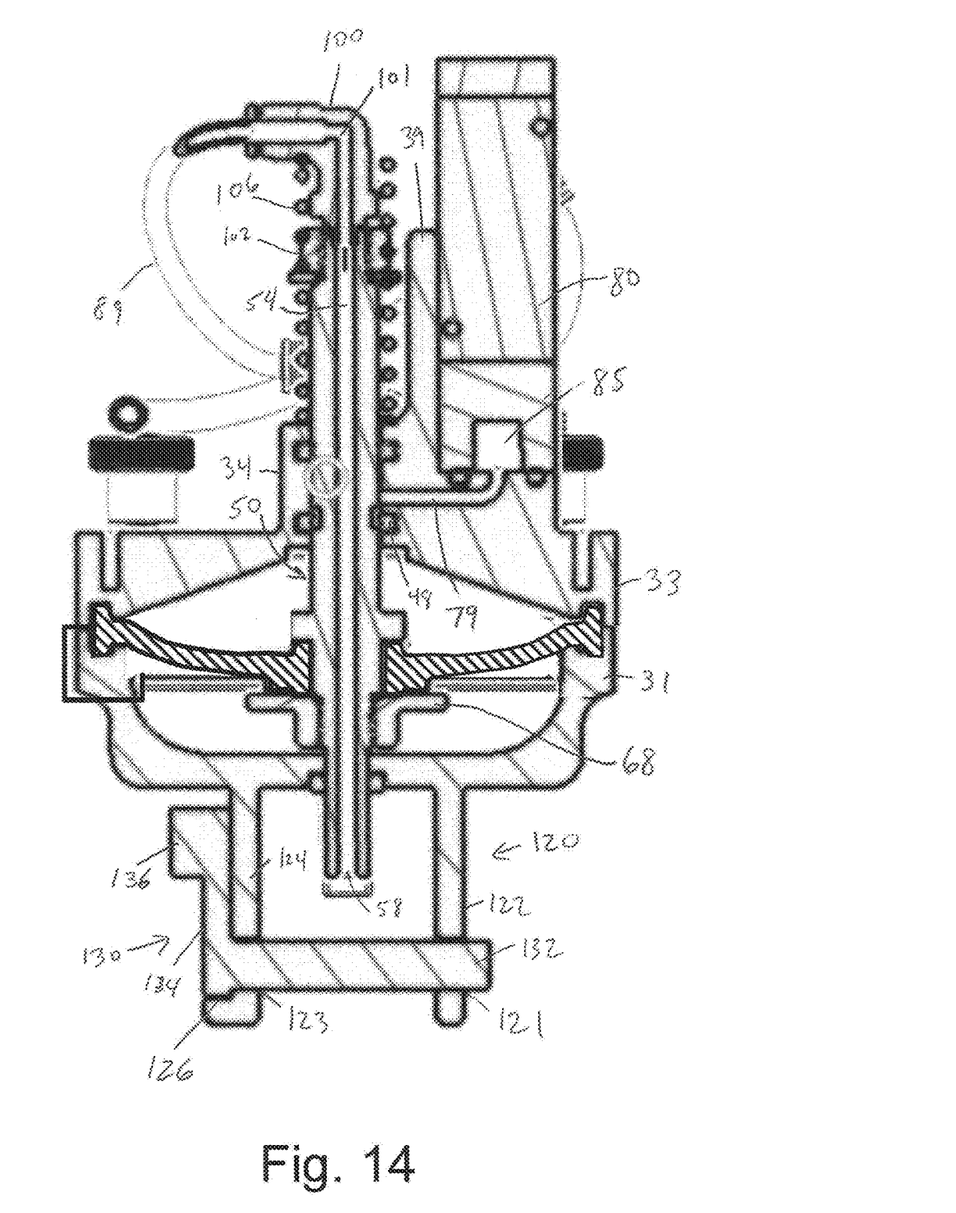
FIG. 14 is a cross-sectional view along the line 14-14 in FIG. 3.

Referring to FIGS. 5 and 6, a central support 34 extends from pump body halve 33 and has a passage 38 configured to receive and support the central shaft 50 for reciprocal motion therein. The central shaft 50 includes a shaft body 52 extending from a first end 51 to a second end 53. A central passage 54 extends through the shaft body 52 from the first end to the second end 53. Threads 59 extend about the first end 51 of the shaft body 52 and the second end 53 defines an air port 58 which extends into the pressure chamber 45, as will be described hereinafter. A central portion of the shaft body 52 defines an outwardly extending shoulder 55 and a series of threads 57 are defined spaced from the shoulder 55. The threads 57 are configured to receive a threaded retaining washer 68 such that the diaphragm 60 is secured relative to the shaft 50 between the shoulder 55 and the retaining washer 68. As such, as the shaft 50 reciprocates, the flexible membrane 64 will be moved between a default position, see FIG. 12, to an extended position, see FIG. 11. Referring to FIG. 14, a spring 106 extends about the first end 51 of the shaft body 52 and is positioned between the central support 34 and a connector 100 connected to the threads 59 of the shaft body first end 51. As such, the spring 106 biases the shaft 50 and diaphragm 60 to the default position.

Referring again to FIG. 6, the shaft body 52 includes a circumferential notch 56 positioned between the end 51 and the shoulder 55. When the shaft 50 is positioned in the passage 38 of the central support 34 and in the default position, the notch 56 is positioned between a pair of sealing rings 48, 49 on the inside surface of the central support 34. The sealing rings 48, 49 seal on the shaft body 52 and close off exit from the air chamber 35a. When the shaft 50 moves to the fully extended position (slightly beyond that shown in FIG. 14), the notch 56 extends beyond the sealing ring 48, thereby creating an air passage from the air chamber 35a to an air exit channel 79 to discharge the air chamber 35a, as will be described hereinafter.

Referring to FIGS. 5 and 11, the pump housing 32 also defines a mixture inlet 36 in communication with a mixture inlet tube 44 defined in the pressure housing 42 attached to the pump housing 32. A suction hose and inlet screen or the like (not shown) are connected to the mixture inlet tube 44. The mixture inlet tube 44 includes a radial barb 28 configure to engage and retain the suction hose, but allows for easy removal and reconnection during cleaning. The suction hose extends into the liquid mixture within the hopper 16, which passes through the inlet screen before being sucked into the pump assembly 30. The mixture inlet 36 is in fluid communication with the receiving chamber 35b defined between the diaphragm 60 and the pump body halve 31. A flexible, one-way valve 70 is positioned on the mixture inlet 36 and only allows fluid flow in the direction from the mixture inlet tube 44 to the receiving chamber 35b. The mixture inlet 36 may have a radial barb or the like extending thereabout. The barb engages an inside surface of the one-way valve 70 to retain the valve 70 in position but allows the valve 70 to be easily removed and replaced during cleaning.

The pump housing 32 also defines a pair of pressure outlets 40, 41 which are in fluid communication with the pressure chamber 45 defined in the pressure housing 42. A flexible, one-way valve 70 is positioned on each pressure outlet 40, 41 and only allows fluid flow in the direction from the receiving chamber 35b to the pressure chamber 45. The pressure outlets may include radial barbs or the like configured to retain the valves 70. As will be described in more detail hereinafter, when the diaphragm 60 moves toward the extended position, the liquid mixture with the receiving chamber 35b is pressurized and driven through the pressure outlets 40, 41 and into the pressure chamber 45. The valve 70 on mixture inlet 36 prevents pressurized fluid from passing to the mixture inlet tube 44 and all of the pressurized fluid is delivered to the pressure chamber 45. Conversely, when the diaphragm 60 moves in the opposite direction toward the default position, a vacuum is created in the receiving chamber 35b, thereby causing liquid mixture to be drawn in through the mixture inlet 36. Due to the one-way valves 70 on the pressure outlets 40, 41, the vacuum force impacts only the mixture inlet 36 and not the pressure chamber 45.

Figure 8:
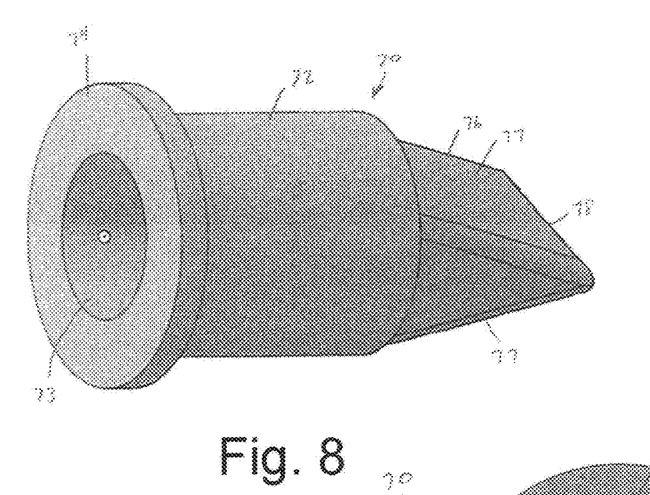
FIG. 8 is an isometric view of an illustrative valve member.
Figure 9:
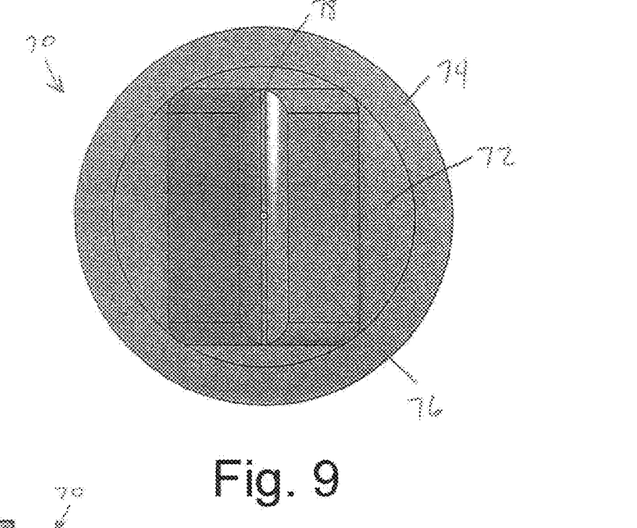
FIG. 9 is an end view of the valve member of FIG. 8.

Referring to FIGS. 8-10, an illustrative flexible valve 70 will be described. Each of the valves 70 has a tubular body 72 with an opening 73 extending thereinto from one end. A flange 74 extends about the open end. The open area within the tubular body 72 includes a side wall 71 and an end wall 75. The size of the open area is preferably such that the inlets and outlet tubes sit within the open area in contact with the side wall 71 and end wall 75, with the barb 45 pressing into the side wall 71. With this configuration, the inlet/outlet tubes provide support for the valve 70, preventing it from inverting or tearing when the pressure from the pump is applied to it. This support system greatly extends the life of the valve and increases the effectiveness of the one-way function of the valve.

The opposite end of the valve 70 includes a generally solid portion 76 with tapered opposed walls 77. A sealed slot 78 extends through the generally solid portion 76. This valve configuration may be referred to as a duckbill valve, however, other one-way valve configurations with a large slot opening may be utilized. With the tapered wall 77 configuration, force directed from the solid end toward the valve causes the slot 78 to be forced into a sealed condition. When a force passes through the opening 73, the force causes the walls 77 to move apart and opens the slot 78 to open. The flexible nature of the valve 70 and the wide slot 78 allows the valves to be tolerant to small particles in the liquid mix (like strawberry seeds, fruit pieces, etc) which greatly extends the types and flavors of liquid mix that can be used to make soft serve ice cream. The duckbill valve design also tolerates a significant amount of butterfat buildup without reducing its effectiveness as a one-way valve.

The use of flexible, one-way valves with a large slot opening for pumping liquid mix and air reduces that complexity and number of parts associated with the pump. This enhancement provides benefits by reducing the cost of manufacturing the pump and it simplifies the routine cleaning procedure for the operator because there are less parts to disassemble, clean and reassemble.

Reciprocation of the shaft 50 and diaphragm 60 is controlled by a supply of pressurized air as herein described. Referring to FIGS. 3 and 4, an air input regulator 90 controls the air input pressure to the system and thereby the liquid pressure. The air input regulator 90 includes a body 92 with an air input 94 and an air outlet 96. The air input 94 receives air from a small compressor (not shown) which delivers air at a constant pressure, for example, 45 psi. Within the body 92, a valve (not shown) controls the flow of air from the input 94 to the outlet 96. An adjustment screw 98 extends from the body 92 and allows a user to control the position of the valve to achieve a desired pressure exiting through the air outlet 96. As seen in FIG. 1, the adjustment screw 98 extends from the pump cover 19 to allow easy adjustment of the pressure exiting the air outlet 96.

Figure 13:
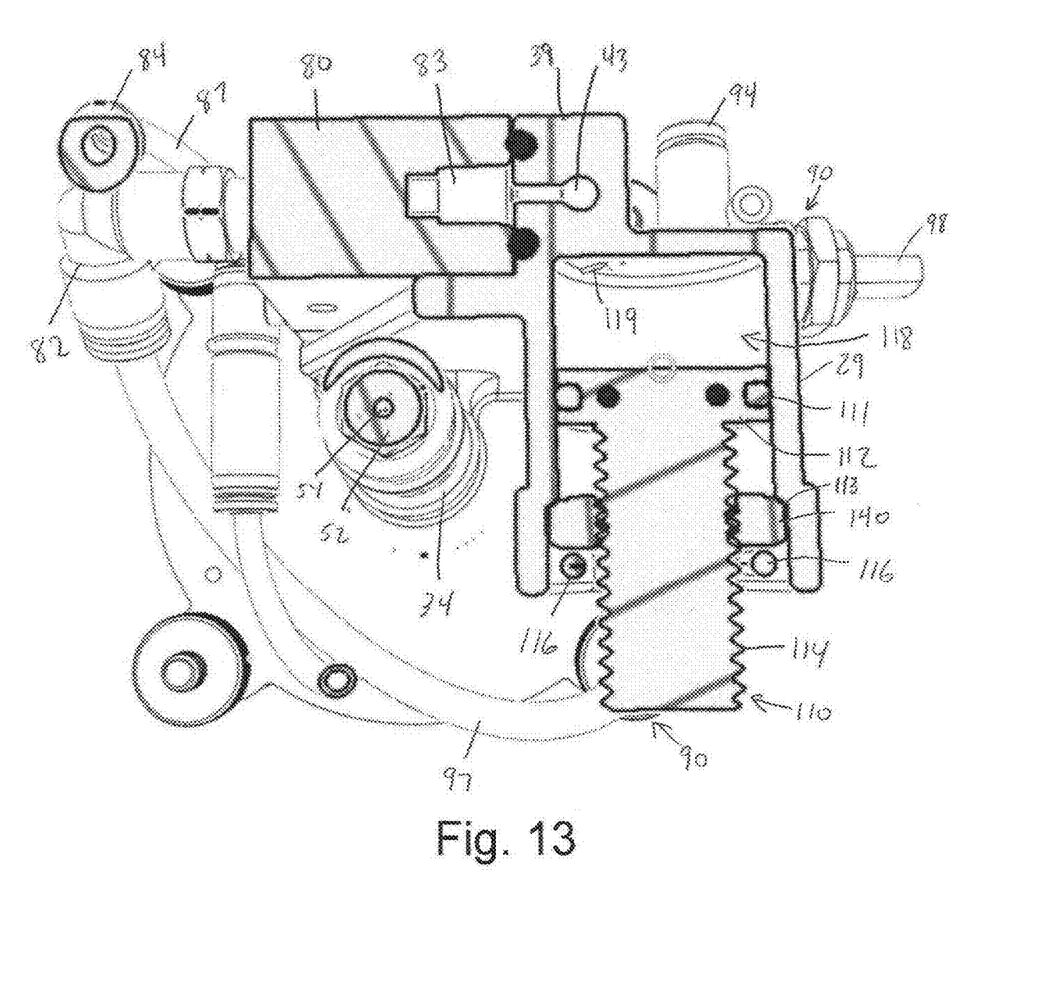
FIG. 13 is a cross-sectional view along the line 13-13 in FIG. 3.
Figure 15:
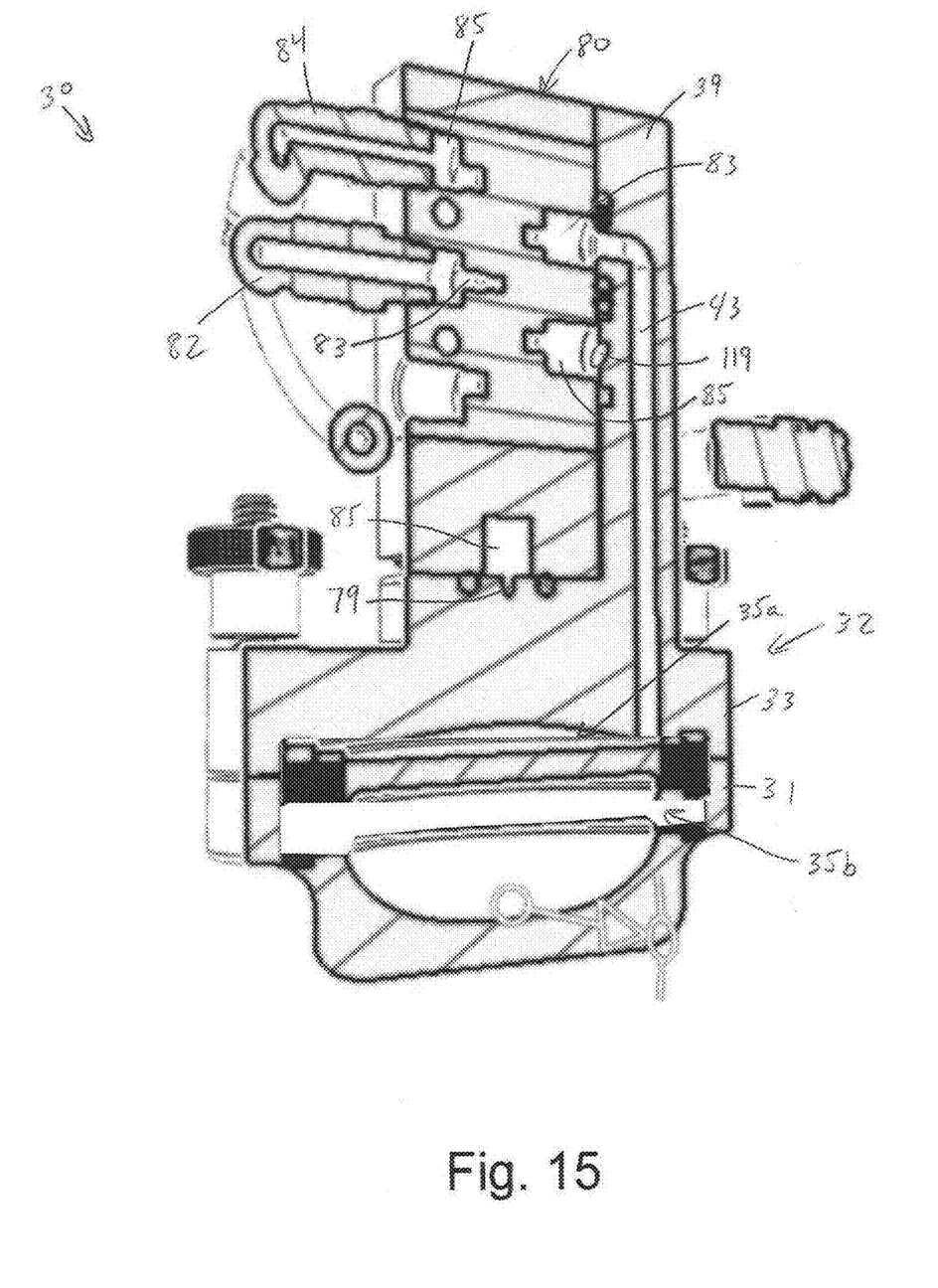
FIG. 15 is a cross-sectional view along the line 15-15 in FIG. 3.

Air from the air outlet 96 travels through a tube 97 to a connector 82 connected to an air manifold 80. The air manifold 80 is connected to channel extension 39 which is formed integral with the pump housing halve 33, but may be otherwise positioned. The channel extension 39 defines an air inlet channel 43 which opens into the air chamber 35a (see FIG. 12) and the air exit channel 79 described above. As illustrated in FIGS. 13 and 15, the manifold 80 defines a channel 83 from the connector 82 to the air inlet channel 43. As such, air at a desired pressure, as regulated by the air input regulator 90, is delivered to the air chamber 35a as indicated by arrow A in FIG. 12 and the diaphragm 60 is forced toward the expanded position as indicated by B in FIG. 11. As explained above, when the diaphragm 60 moves toward the extended position, the liquid mixture within the receiving chamber 35b is pressurized and driven through the pressure outlets 40, 41 and into the pressure chamber 45. The valve 70 on mixture inlet 36 prevents pressurized fluid from passing to the mixture inlet tube 44 and all of the pressurized fluid is delivered to the pressure chamber 45.

Movement of the diaphragm 60 also causes the shaft 50 to move toward the housing halve 31. When the end 53 of the shaft 50 reaches full travel, the notch 56 in the shaft body 52 overlaps the o-ring 48, thereby allowing air in the air chamber 35a to travel past the o-ring seal 48 into the air exit channel 79. The air in the air chamber 35a will exit as the diaphragm 60 moves back to the default position under the bias of the spring 106. Referring to FIG. 15, the manifold 80 defines a channel 85 which extends from the air exit channel 79 to connector 84. The connector 84 is connected via tubes 87 and 89 and one-way check valve 88 to the connector 100 which is connected to the central shaft 50. The check valve 88 prevents any air/mixture from being pushed back into the air control valve. As such, the air from the air chamber 35a is delivered through the manifold channel 85, the tubes 87, 89, valve 88, connector 100 and passage 54 to the pressure chamber 45. Here the liquid mixture is mixed with the pressurized air and then the air/liquid mixture is delivered out of outlet 46 to the freezing chamber (not shown) via tube 47.

To control the amount of the air delivered to the pressure chamber 45, the channel 85 is in fluid communication with an air overrun chamber 118 within an overrun control housing 29 via channel 119 (see FIGS. 13 and 15). In the illustrated embodiment, the overrun control housing 29 is formed integral with the pump housing halve 33, but may be otherwise positioned. With reference to FIGS. 3 and 13, the air overrun chamber 118 is defined between the overrun control housing 29 and the head 112 of an adjustment screw 110. An o-ring 111 or the like seals between the head 112 and the overrun control housing 29. The threaded shaft 114 of the adjustment screw 110 extends through a threaded washer 140 positioned within the overrun control housing 29. In the illustrated embodiment, pins 116 extending through slots 117 in the overrun control housing 29 retain the washer 140 against an internal shoulder 113 to maintain the position thereof. A slot 115 at the free end of the adjustment screw 110 may be engaged by a screwdriver or the like to control the volume of the air overrun chamber 118. While a slotted screw is illustrated, other adjustment mechanisms may also be utilized. As illustrated in FIG. 1, the slot 115 of the adjustment screw 110 is accessible through the pump cover 19 such that adjustment may be easily made. By adjusting the volume of the air overrun chamber 118, which is in fluid communication with the channel 85, a user can control the amount of air delivered to the pressure chamber 45.

With reference to FIGS. 3, 4, 11, 12 and 14, a connection assembly 120 will be described. The connection assembly 120 is configured to releasably attach the pressure housing 42 which allows the pump to easily be disassembled to clean, etc. The connection assembly 120 includes a pair of spaced apart legs 122, 124 depending from the pump housing halve 31. Each leg 122, 124 has a respective bore 121, 123 configured to receive a cross-bar portion 132 of a lock member 130. As seen in FIG. 11, the cross-bar portion 132 has a D-shaped cross-section. The cross-bar portion 132 extends through the bores 121, 123 and connects with an arm portion 134 extending within a receiving area 126 of the leg 124. A handle portion 136 extends from the arm portion 124 and is configured to pivot the lock member 130 from the locked position shown in the figures, to an unlock position wherein the arm portion 134 is moved away from the stop surface 125 of the receiving area 126. In the locked position, the larger diameter portion of the cross-bar portion 132 engages the pressure housing 42 to maintain it in position. In the unlock position, the narrow diameter portion of the cross-bar portion 132 is aligned with the pressure housing 42 such that the pressure housing 42 is freed to be removed.

With the separate air pressure regulator and overrun control, the air driven, diaphragm pump 30 of the present disclosure provides a constant pressure, variable flow of mix to the freezer barrel. The internal air control valve allows the pump to reciprocate smoothly and compressed air from the air chamber is injected into the barrel on each return stroke. The steady barrel pressure provides consistent overrun regardless of the barrel draw rate. The constant pressure system also allows soft serve to be dispensed smoothly at high overrun rates, without air pockets that plague many mix pumps. The adjustable overrun air chamber also provides on-the-go overrun adjustments (e.g. 20%-85% overrun adjustment). Furthermore, the pump design automatically adjusts the flow rate based on the barrel pressure of the machine, ie the pump runs at the speed necessary to maintain a constant barrel pressure regardless of how fast the user is tapping ice cream. The pump system automatically controls the barrel pressure without the use of a barrel pressure sensor or pressure relief valve. This minimizes the foam that is normally created in the mix hopper from bypassed liquid/air.

These and other advantages of the present invention will be apparent to those skilled in the art from the foregoing specification. Accordingly, it will be recognized by those skilled in the art that changes or modifications may be made to the above-described embodiments without departing from the broad inventive concepts of the invention. It should therefore be understood that this invention is not limited to the particular embodiments described herein, but is intended to include all changes and modifications that are within the scope and spirit of the invention as defined in the claims.

What is claimed is:

1. A pump assembly comprising:
a diaphragm pump comprising a diaphragm extending across a chamber to define a gas chamber on a first side of the diaphragm and a mixture receiving chamber on a second, opposite side of the diaphragm, and a shaft extending through the diaphragm and moving therewith between a default position and an extended position;
the mixture receiving chamber configured to receive a liquid mixture via a mixture inlet and pass the liquid mixture to a pressure chamber via a mixture outlet;
the gas chamber having an inlet port receiving gas of a desired pressure and an outlet port, a sealing ring on the shaft preventing communication between the inlet port and the outlet port until the diaphragm and shaft are in the extended position at which time the gas in the gas chamber passes from the gas chamber to the pressure chamber;
the pressure chamber having a pressure outlet configured to deliver a pressurized liquid mixture and the gas to a freezing chamber;
wherein each stroke of the diaphragm causes the pressurized liquid mixture and gas to be passed into the pressure chamber and to the pressure outlet.

2. The pump assembly according to claim 1 wherein the gas is air.

3. The pump assembly according to claim 1 wherein a flexible, one-way valve is positioned on each of the mixture inlet and the mixture outlet.

4. The pump assembly according to claim 3 wherein each of the flexible, one-way valves has a duckbill configuration.

5. The pump assembly according to claim 1 wherein the gas of a desired pressure is provided by a compressor in combination with a pressure regulator.

6. The pump assembly according to claim 5 wherein the diaphragm pump is positioned within a pump cover and an adjustment screw of the pressure regulator extends through an opening in the pump cover.

7. The pump assembly according to claim 1 wherein an overrun adjustment chamber is defined between the gas chamber and the pressure chamber.

8. The pump assembly according to claim 7 wherein the overrun adjustment chamber has an adjustable volume.

9. The pump assembly according to claim 8 wherein the volume of the overrun adjustment chamber is adjustable during operation of the diaphragm pump.

10. The pump assembly according to claim 8 wherein the diaphragm pump is positioned within a pump cover with an opening therein and an adjustment screw which is utilized to adjust the volume of the overrun adjustment chamber is aligned with and accessible through the pump cover opening.

11. The pump assembly according to claim 10 wherein the adjustment screw is releasably secured relative to the overrun adjustment chamber.

12. The pump assembly according to claim 1 wherein the pressure chamber is defined within a pressure housing which is releasably attached to the diaphragm pump.

13. The pump assembly according to claim 12 wherein removal of the pressure housing exposes the mixture inlet and mixture outlet.

14. The pump assembly according to claim 1 wherein a spring biases the shaft and diaphragm to the default position.

15. The pump assembly according to claim 1 wherein the shaft extends from a first end to a second end and the second end extends through said sealing ring through the chamber and into the pressure chamber.

16. The pump assembly according to claim 15 wherein a gas passage is defined through the shaft from the first end to the second end.

17. The pump assembly according to claim 16 wherein a gas path fluidly connects the gas chamber with the gas passage at the first end of the shaft.

18. The pump assembly according to claim 1 wherein the diaphragm pump provides a constant pressure, variable flow of mix to an associated freezer barrel.

19. The pump assembly according to claim 18 wherein a pressure within the freezer barrel is automatically maintained without the use of a barrel pressure sensor or pressure relief valve.

20. The pump assembly according to claim 19 wherein a speed of the pump automatically adjusts to maintain a constant barrel pressure regardless of a rate of flow from the freezer barrel.

* * * * *